United States Patent
Lee et al.

(10) Patent No.: US 10,328,785 B2
(45) Date of Patent: Jun. 25, 2019

(54) POWER TRANSMISSION APPARATUS OF HYBRID ELECTRIC VEHICLE

(71) Applicants: HYUNDAI MOTOR COMPANY, Seoul (KR); KIA MOTORS CORPORATION, Seoul (KR)

(72) Inventors: Kyeong Hun Lee, Seoul (KR); Jong Soo Kim, Seoul (KR); Jong Sool Park, Hwaseong-si (KR); Dong Hwan Hwang, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 153 days.

(21) Appl. No.: 15/699,632

(22) Filed: Sep. 8, 2017

(65) Prior Publication Data
US 2018/0154757 A1   Jun. 7, 2018

(30) Foreign Application Priority Data
Dec. 7, 2016   (KR) .................. 10-2016-0165930

(51) Int. Cl.
| | |
|---|---|
| F16H 3/06 | (2006.01) |
| B60K 6/365 | (2007.10) |
| F16H 3/089 | (2006.01) |
| F16H 3/00 | (2006.01) |
| F16H 37/04 | (2006.01) |
| F16H 37/08 | (2006.01) |
| B60K 6/48 | (2007.10) |
| B60K 6/547 | (2007.10) |

(52) U.S. Cl.
CPC ............. *B60K 6/365* (2013.01); *B60K 6/48* (2013.01); *B60K 6/547* (2013.01); *F16H 3/006* (2013.01); *F16H 3/089* (2013.01); *F16H 37/04* (2013.01); *F16H 37/0806* (2013.01); *B60K 2006/4825* (2013.01); *B60Y 2200/92* (2013.01); *F16H 2037/048* (2013.01); *F16H 2200/0043* (2013.01); *Y02T 10/6221* (2013.01); *Y02T 10/6252* (2013.01); *Y10S 903/91* (2013.01); *Y10S 903/919* (2013.01)

(58) Field of Classification Search
CPC ............................. F16H 3/006; F16H 3/089
See application file for complete search history.

(56) References Cited

U.S. PATENT DOCUMENTS

| | | | |
|---|---|---|---|
| 2015/0167804 A1* | 6/2015 | Lee | B60K 6/365 475/5 |
| 2015/0167805 A1* | 6/2015 | Lee | F16H 61/0403 475/5 |

(Continued)

FOREIGN PATENT DOCUMENTS

| | | |
|---|---|---|
| JP | H09-123773 A | 5/1997 |
| JP | 2009-255776 A | 11/2009 |

(Continued)

*Primary Examiner* — Derek D Knight
(74) *Attorney, Agent, or Firm* — Brinks Gilson & Lione

(57) ABSTRACT

A power transmission apparatus of a hybrid electric vehicle includes an input unit including four input shafts disposed with several input gears, torque converting unit including a planetary gear set having rotational elements connected with the input shafts, and a shifting output unit for shifting torques received from the input shafts and outputting the shifted torque.

17 Claims, 6 Drawing Sheets

(56) References Cited

U.S. PATENT DOCUMENTS

2015/0167806 A1* 6/2015 Lee ................... F16H 61/0403
                                                    475/5
2018/0065467 A1* 3/2018 Lee ....................... B60K 6/365

FOREIGN PATENT DOCUMENTS

| KR | 10-2016-0056713 A | 5/2016 |
|----|-------------------|--------|
| KR | 10-1628130 B1     | 6/2016 |
| WO | 2010/116818 A1    | 10/2010 |

* cited by examiner

FIG. 2

| Shift-stage | ECL | CL1 | CL2 | CL3 | SL1 | | SL2 | | Remark |
|---|---|---|---|---|---|---|---|---|---|
| | | | | | D1 | D3 | D2 | D4 | |
| Engine-starting | ● | ● | | | | | | | |
| Neutral | ● | | | | ● | | | | |
| Neutral battery chargin | ● | | ● | | | | | | |
| Fixed gear ratio mode 1 | ● | ● | ● | | ● | | | | |
| Fixed gear ratio mode 2 | ● | ● | ● | ● | | | ● | | Engine-driven, motor-assisted |
| Fixed gear ratio mode 3 | ● | ● | ● | ● | | ● | | | |
| Fixed gear ratio mode 4 | ● | ● | ● | ● | | | | ● | |
| Variable gear ratio mode 1 | ● | | ● | ● | ● | | | | Engine-driven, motor-driven |
| Variable gear ratio mode 2 | ● | | ● | | ● | ● | | | |
| EV mode 1 | | ● | ● | ● | | | ● | | Motor-driven |
| EV mode 2 | | ● | ● | ● | | ● | | | |
| EV mode 3 | | ● | ● | ● | | | | ● | |
| EV mode 4 | | ● | ● | ● | | | | ● | |
| EV mode R | | ● | ● | | ● | | | | Motor-driven (reverse) |

FIG. 4

| Shift-stage | ECL | CL1 | CL2 | CL3 | SL1 D1 | SL1 D3 | SL2 D2 | SL2 D4 | SL3 RG | Remark |
|---|---|---|---|---|---|---|---|---|---|---|
| Engine-starting | ● | ● | | | ● | | | | | |
| Neutral | ● | | | | | | | | | |
| Neutral battery charging | ● | ● | | | ● | | | | | |
| Fixed gear ratio mode 1 | ● | ● | ● | | ● | | | | | Engine-driven, motor-assisted |
| Fixed gear ratio mode 2 | ● | ● | ● | ● | | | | | | Engine-driven, motor-assisted |
| Fixed gear ratio mode 3 | ● | ● | ● | | | ● | ● | | | Engine-driven, motor-assisted |
| Fixed gear ratio mode 4 | ● | ● | ● | ● | | ● | | | | Engine-driven, motor-assisted |
| Fixed gear ratio mode R | ● | ● | ● | | | | | | ● | Engine-driven, motor-assisted |
| Variable gear ratio mode 1 | ● | | ● | | ● | | | | | Engine-driven, motor-driven |
| Variable gear ratio mode 2 | ● | | ● | | | ● | | | | Engine-driven, motor-driven |
| Variable gear ratio mode R | ● | | ● | | | | | | ● | Engine-driven, motor-driven |
| EV mode 1 | | ● | ● | | ● | | | | | Motor-driven |
| EV mode 2 | | ● | ● | ● | | | | | | Motor-driven |
| EV mode 3 | | ● | ● | | | ● | | | | Motor-driven |
| EV mode 4 | | ● | ● | ● | | | | ● | | Motor-driven |
| EV mode R | | ● | ● | | ● | | | | ● | Motor-driven (reverse) |

FIG. 6

| Shift-stage | ECL | CL1 | CL2 | CL3 | SL1 D1 | SL1 D3 | SL2 D2 | SL3 RG | SL4 D4 | Remark |
|---|---|---|---|---|---|---|---|---|---|---|
| Engine-starting | ● | ● | | | | | | | | |
| Neutral | ● | | | | ● | | | | | |
| Neutral battery chargin | ● | ● | | | ● | | | | | |
| Fixed gear ratio mode 1 | ● | ● | ● | | ● | | | | | Engine-driven, motor-assisted |
| Fixed gear ratio mode 2 | ● | ● | ● | ● | ● | | | | | Engine-driven, motor-assisted |
| Fixed gear ratio mode 3 | ● | ● | ● | | | ● | | | | Engine-driven, motor-assisted |
| Fixed gear ratio mode 4 | ● | ● | ● | ● | | | ● | | | Engine-driven, motor-assisted |
| Fixed gear ratio mode R | ● | ● | ● | | ● | | | | | |
| Variable gear ratio mode 1 | ● | ● | ● | | | ● | | | | Engine-driven, motor-driven |
| Variable gear ratio mode 2 | ● | ● | ● | | | | ● | | | Engine-driven, motor-driven |
| Variable gear ratio mode R | ● | | ● | ● | | ● | | | | Engine-driven, motor-driven |
| EV mode 1 | | ● | ● | ● | ● | | | | | Motor-driven |
| EV mode 2 | | ● | ● | | | ● | | | | Motor-driven |
| EV mode 3 | | ● | ● | | | | ● | | | Motor-driven |
| EV mode 4 | | ● | ● | | | | | ● | | Motor-driven |
| EV mode 1R | | ● | ● | | ● | | | ● | | Motor-driven (reverse) |

POWER TRANSMISSION APPARATUS OF HYBRID ELECTRIC VEHICLE

CROSS-REFERENCE TO RELATED APPLICATION

This application claims priority to and the benefit of Korean Patent Application No. 10-2016-0165930, filed Dec. 7, 2016, which is incorporated herein by reference in its entirety.

FIELD

The present disclosure relates to a power transmission apparatus of a hybrid electric vehicle.

BACKGROUND

The statements in this section merely provide background information related to the present disclosure and may not constitute prior art.

An environmentally-friendly technology of a vehicle is a core technology which controls survival of a future automobile industry, and advanced car makers have focused their energy on the development of an environmentally-friendly vehicle to comply with environmental and fuel efficiency regulations.

Therefore, car makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes. For example, a gasoline engine or a diesel engine using the existing fossil fuel and a motor/generator driven by electric energy are mixed and used as the power sources.

The hybrid electric vehicle generally uses an engine and a motor/generator, and uses as a secondary power source a motor/generator having a relatively excellent low-speed torque characteristic at a low speed and uses as the primary power source an engine having a relatively excellent high-speed torque characteristic at a high speed.

As a result, the hybrid electric vehicle is excellent in fuel efficiency enhancement and reduction of exhaust gas because an operation of the engine using fossil fuel stops and the motor/generator is used at a low-speed section.

A double clutch transmission (DCT) may be an example of a transmission applicable to such a hybrid electric vehicle. Such a DCT includes two clutches applied to a manual transmission scheme, and thereby enhances efficiency and convenience.

The DCT alternatingly activates odd-numbered shift-stages and even-numbered shift-stages by alternatingly operating two clutches, and thereby improves continuity in torque transmission.

However, we have discovered that the DCT shows relatively high degree of clutch wear and energy loss in starting of a vehicle and rearward slip in starting of a vehicle on a slant. In addition, the DCT is typically controlled with a short shift-control period considering low heat capacity, and thus may easily show a shift shock.

In addition, in order to apply the DCT to a hybrid electric vehicle, an appropriate arrangement of a motor/generator as a power source must be devised.

The above information disclosed in this Background section is only for enhancement of understanding of the background of the present disclosure and therefore it may contain information that does not form the prior art that is already known to a person of ordinary skill in the art.

SUMMARY

The present disclosure provides a power transmission apparatus for a hybrid electric vehicle having advantages of smooth starting and shifting of a vehicle and improvement of fuel efficiency and acceleration performance.

As one form of the present disclosure, a power transmission apparatus of a hybrid electric vehicle includes: an input unit, a torque converting unit, and a shifting output unit. The input unit may include a first input shaft selectively connected with an the engine and the motor/generator, a second input shaft selectively connected with the motor/generator, a third input shaft fixedly disposed with at least one input gear, and a fourth input shaft selectively connected with the first input shaft and fixedly disposed with at least one input gear. The torque converting unit may include a planetary gear set having a first rotational element connected with the second input shaft, a second rotational element connected with the third input shaft, and a third rotational element connected with the first input shaft. The shifting output unit may shift torques received from the third and fourth input shafts and output a shifted torque.

The second and third input shafts of the input unit may be formed as a hollows shaft.

The first, second, and third input shafts may be coaxially disposed in an order of the first, second, and third input shafts in a radial direction.

The fourth input shaft may be formed as a hollow shaft, disposed rearward to the second and third input shafts, and coaxially disposed with the first input shaft.

The torque converting unit may be disposed on the first input shaft at a location between the second and third input shafts and the fourth input shaft.

The torque converting unit may be a single pinion planetary gear set having a sun gear as the first rotational element, a planet carrier as the second rotational element, and a ring gear as the third rotational element.

The at least one input gear fixedly disposed on the third input shaft may include a first input gear acting as an input gear for the forward first speed, and a second input gear acting as an input gear for the forward third speed. The input gears fixedly disposed on the first input shaft may include a third input gear acting as an input gear for the forward second speed, and a fourth input gear acting as an input gear for the forward fourth speed. The first, second, third, and fourth input gears may be arranged in the order of the first, second, third, and fourth input gears from upstream to downstream direction.

The shifting output unit may include a first shifting output device, and the first shifting output device may include: a first output shaft disposed in parallel with the first input shaft, forward first and third speed shifting gears externally engaged with the first and second input gears, and selectively synchronized with the first output shaft by a first synchronizer, forward second and fourth speed shifting gears externally engaged with the third and fourth input gears, and selectively synchronized with the first output shaft by a second synchronizer, and a first output gear fixedly disposed at an upstream portion of the first output shaft.

The shifting output unit may further include: a second shifting output device that includes a second output shaft disposed in parallel with the first input shaft; a reverse speed shifting gear rotatably disposed on the second output shaft and selectively synchronized with the second output shaft by the second synchronizer; a reverse speed idle shaft disposed in parallel with the second output shaft; a reverse speed idle gear rotatably disposed on the reverse speed idle shaft and externally engaged with the first input gear and the reverse speed shifting gear; and a second output gear fixedly disposed at an upstream portion of the second output shaft.

The shifting output unit may include first and second shifting output devices. The first shifting output device may include: a first output shaft disposed in parallel with the first input shaft; forward first and third speed shifting gears rotatably disposed on the first output shaft, externally engaged with the first and second input gears, and selectively synchronized with the first output shaft by a first synchronizer; a forward second speed shifting gear rotatably disposed on the first output shaft, externally engaged with the third input gear, and selectively synchronized with the first output shaft by a second synchronizer; and a first output gear fixedly disposed at an upstream portion of the first output shaft. The second shifting output device may include: a second output shaft disposed in parallel with the first input shaft; a reverse speed shifting gear rotatably disposed on the second output shaft and selectively synchronized with the second output shaft by a third synchronizer; a reverse speed idle shaft disposed in parallel with the second output shaft; a reverse speed idle gear rotatably disposed on the reverse speed idle shaft and externally engaged with the first input gear and the reverse speed shifting gear; a forward second speed shifting gear rotatably disposed on the second output shaft, externally engaged with the third input gear on the fourth input shaft, and selectively synchronized with the second output shaft by a fourth synchronizer; and a second output gear fixedly disposed at an upstream portion of the second output shaft.

A power transmission apparatus of a hybrid electric vehicle according to an exemplary form of the present disclosure shows effective improvement of fuel consumption by realizing four shift-stages in a fixed gear ratio mode by using the engine ENG as a primary power source and the motor/generator as an auxiliary power source, two shift-stages in a variable gear ratio mode enabling electronic continuously variable shifting by using the engine ENG and the motor/generator as power sources, and four shift-stages in an EV mode by only using the motor/generator.

In particular, a driving efficiency may be enhanced by operating a power transmission apparatus in the variable gear ratio mode for city driving, and in the fixed gear ratio mode for high speed driving.

In addition, smooth starting of a vehicle may be achieved by the engine ENG and the motor/generator connected with respective rotational elements of the planetary gear set.

When the motor/generator fails, a vehicle may be driven by the torque of the engine ENG.

In the fixed gear ratio mode, the torque of the motor/generator may be used as an auxiliary power source, thereby improving an acceleration performance.

The reverse speed driving may be achieved by reversely driving the motor/generator MG. In addition, a reverse speed shifting device is separately included such that the reverse speed may be realized also in the fixed gear ratio and the variable gear ratio mode as well as the EV mode.

Further, effects that can be obtained or expected from exemplary forms of the present disclosure are directly or suggestively described in the following detailed description. That is, various effects expected from exemplary forms of the present disclosure will be described in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operational chart for respective shift-stages of a power transmission apparatus of a hybrid electric vehicle according to a first exemplary form of the present disclosure;

FIG. 4 is an operational chart for respective shift-stages of a power transmission apparatus of a hybrid electric vehicle according to a second exemplary form of the present disclosure;

FIG. 6 is an operational chart for respective shift-stages of a power transmission apparatus of a hybrid electric vehicle according to a third exemplary form of the present disclosure.

Figure 1:
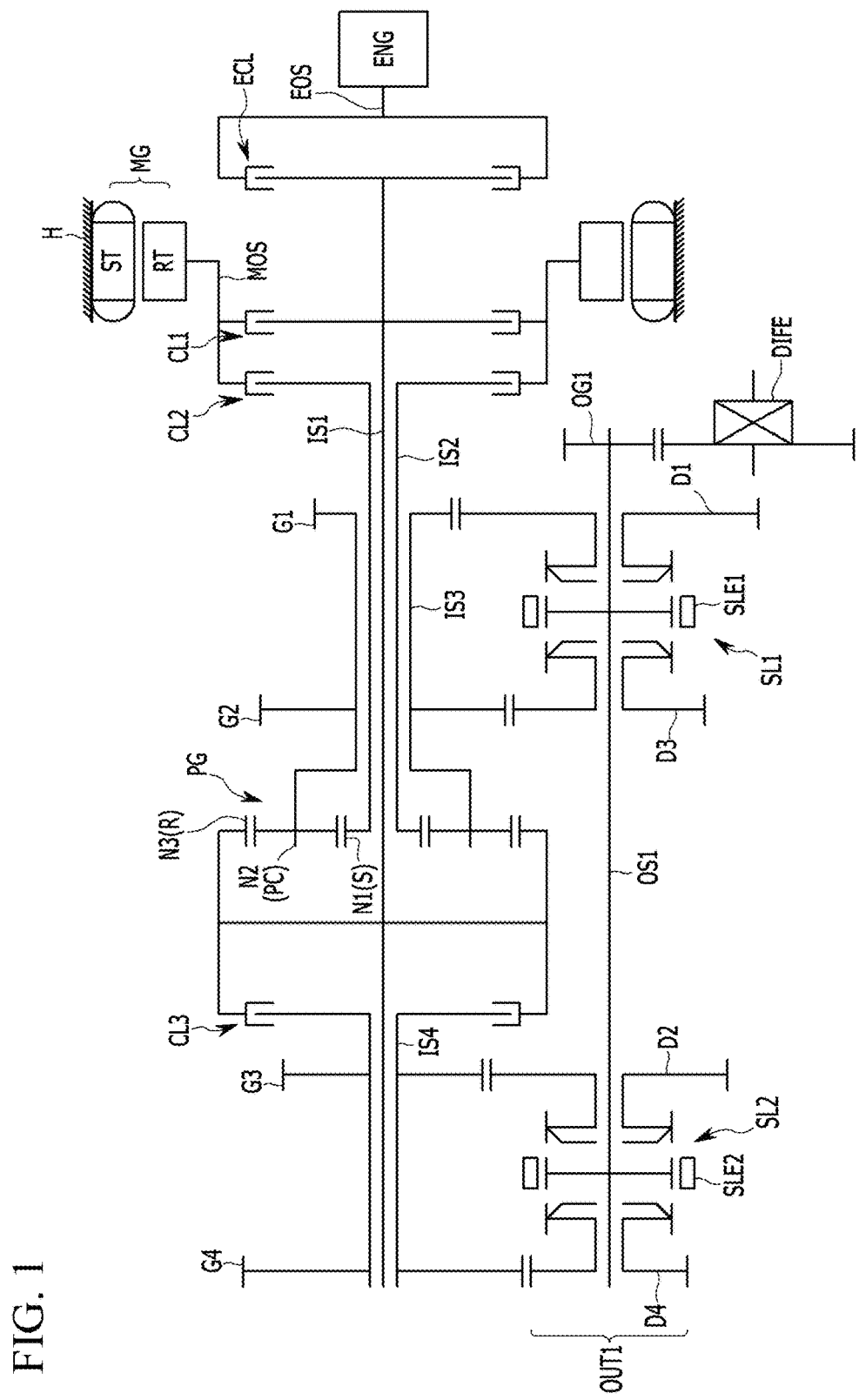
FIG. 1 is a schematic diagram of a power transmission apparatus of a hybrid electric vehicle according to a first exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In this detailed description, front or upstream of the transmission is referred to as a side close to the engine, and rear or downstream of the transmission is referred to as a side distal to the engine.

In the following description, dividing names of components into first, second and the like is to divide the names because the names of the components are the same as each other and an order thereof is not particularly limited.

FIG. 1 is a schematic diagram of a power transmission apparatus of a hybrid electric vehicle according to a first exemplary form of the present disclosure.

Referring to FIG. 1, a power transmission apparatus of a hybrid electric vehicle utilizes an engine ENG and a motor/generator MG as power sources, and includes an input unit, a torque converting unit, and a shifting output unit.

The engine ENG is a primary power source and a gasoline engine or a diesel engine using the existing fossil fuel may be used as the engine ENG.

The motor/generator MG is an electric supplementary drive unit (ESDU), and functions as a motor that generates a driving torque and also as a generator that generates electric energy producing mechanical reactive force. The motor/generator MG includes a stator ST fixed to a transmission housing H and a rotor RT rotatable inside the stator, where the rotor RT is directly connected with a motor output shaft MOS.

The input unit includes first, second, third, and fourth input shafts IS1, IS2, IS3, and IS4.

The first input shaft IS1 is formed as a solid shaft, and disposed at a same axis with an engine output shaft EOS. An upstream portion of the first input shaft IS1 is selectively connected with the engine output shaft EOS and the motor output shaft MOS respectively.

The second input shaft IS2 is formed as a hollow shaft, and rotatably coaxially disposed on an external circumference of the first input shaft IS1. An upstream portion of the second input shaft IS2 is selectively connected with the motor output shaft MOS.

The third input shaft IS3 is formed as a hollow shaft, and rotatably coaxially disposed on an external circumference of the second input shaft IS2.

The fourth input shaft IS4 is formed as a hollow shaft, and rotatably coaxially disposed on an external circumference of the first input shaft IS1. An upstream portion of the fourth input shaft IS4 is selectively connected with the first input shaft IS1.

First and second input gears G1 and G2 are fixedly disposed on the third input shaft IS3, and third and fourth input gears G3 and G4 are fixedly disposed on the fourth input shaft IS4.

The first, second, third, and fourth input gears G1, G2, G3, and G4 act as input gears for respective shift-stages, where the first input gear G1 acts as an input gear for realizing the forward first speed and the reverse speed (EV mode R: when the motor is reversely driven), the second input gear G2 as an input gear for realizing the forward third speed, the third input gear G3 as an input gear for realizing the forward second speed, and the fourth input gear G4 as an input gear for realizing the forward fourth speed.

A clutch unit including an engine clutch ECL and first, second, and third clutches CL1, CL2, and CL3 is disposed between first, second, and fourth input shafts IS1, IS2, and IS4 and the power sources of the engine ENG and the motor/generator MG.

The engine clutch ECL is disposed between the engine output shaft EOS and the first input shaft IS1, and selectively transmits torque from the engine ENG to the first input shaft IS1.

The first clutch CL1 is disposed between the motor output shaft MOS and the first input shaft IS1, and selectively transmits torque from the motor/generator MG to the first input shaft IS1.

The second clutch CL2 is disposed between the motor output shaft MOS and the second input shaft IS2, and selectively transmits torque from the motor/generator MG to the second input shaft IS2.

The third clutch CL3 is disposed between the first input shaft IS1 and the fourth input shaft IS4, and selectively transmits torque from the first input shaft IS1 to the fourth input shaft IS4.

The engine clutch ECL and the first, second, and third clutches CL1, CL2, and CL3 may be realized as multi-plate hydraulic pressure friction devices that are frictionally engaged by hydraulic pressure.

The torque converting unit is formed as a planetary gear set PG that is a single pinion planetary gear set having three rotational elements.

The three rotational elements of the planetary gear set PG include first, second, and third rotational elements N1, N2, and N3, where the first rotational element N1 is a sun gear, the second rotational element N2 is a planet carrier PC that rotatably supports one or more pinion gears externally engaged with the sun gear S, and the third rotational element N3 is a ring gear R engaged with the one or more pinion gears.

The first rotational element N1 is directly connected with the second input shaft IS2, the second rotational element N2 is directly connected with the third input shaft IS3, and the third rotational element N3 is directly connected with the first input shaft IS1.

When torques of the engine ENG and the motor/generator MG are selectively transmitted to the first rotational element N1 and the third rotational element N3 through the first and second input shafts IS1 and IS2, such input torques are converted and output to the third input shaft IS3 through the second rotational element N2.

The shifting output unit includes a first shifting output device OUT1 that receives torques from the first, second, third, and fourth input gears G1, G2, G3, and G4 on the third and fourth input shafts IS3 and IS4 and outputs shifted torques.

The first shifting output device OUT1 includes a first output shaft OS1 and forward first speed, second speed, third speed, and fourth speed shifting gears D1, D2, D3, and D4. The first output shaft OS1 is disposed in parallel with the first input shaft IS1, and the forward first speed, second speed, third speed, and fourth speed shifting gears D1, D2, D3, and D4 are externally engaged with the first, second, third, and fourth input gears G1, G2, G3, and G4 respectively.

The forward first speed, third speed, second speed, and fourth speed shifting gears D1, D3, D2, and D4 are rotatably disposed on the first output shaft OS1.

The first shifting output device OUT1 further includes first and second synchronizers SL1 and SL2. The first synchronizer SL1 is disposed on the first output shaft OS1 and selectively synchronizes the forward first speed and third speed shifting gears D1 and D3 to the first output shaft OS1. The second synchronizer SL2 is disposed on the first output shaft OS1 and selectively synchronizes the forward second speed and fourth speed shifting gears D2 and D4 to the first output shaft OS1.

The forward first speed shifting gear D1 is externally engaged with the first input gear G1, and the forward third speed shifting gear D3 is externally engaged with the second input gear G2.

The forward second speed shifting gear D2 is externally engaged with the third input gear G3, and the forward fourth speed shifting gear D4 is externally engaged with the fourth input gear G4.

The torque shifted at the first shifting output device OUT1 is transmitted to a differential device DIFF through a first output gear OG1 fixed to an upstream portion of the first output shaft OS1.

The first and second synchronizers SL1 and SL2 may be formed as a known scheme, and the first and second sleeves SLE1 and SLE2 applied to the first and second synchronizers SL1 and SL2 may be operated by an actuator (not shown) that may be controlled by a transmission control unit.

A power transmission apparatus of a hybrid electric vehicle of such a scheme may enable a fixed gear ratio mode that simulates a double clutch transmission, a variable gear ratio mode (eCVT mode), and electric vehicle mode (EV mode).

FIG. 2 is an operational chart for respective shift-stages of a power transmission apparatus of a hybrid electric vehicle according to a first exemplary form of the present disclosure, and shifting operation of the power transmission apparatus is hereinafter described in detail with reference to FIG. 2.

[Engine Starting]

In an engine starting mode, while the forward first speed shifting gear D1 is synchronized to the first output shaft OS1 by operating the first sleeve SLE1 of the first synchronizer SL1, the engine clutch ECL and the first clutch CL1 are operated.

Then, a driving torque of the motor/generator MG is transmitted to the engine ENG through the motor output shaft MOS, the first clutch CL1, the first input shaft IS1, the engine clutch ECL, and the engine output shaft EOS, and the engine ENG is started.

[Neutral]

In a neutral mode, while the forward first speed shifting gear D1 is synchronized to the first output shaft OS1 by operating the first sleeve SLE1 of the first synchronizer SL1, the engine clutch ECL is operated.

In this case, although the torque of the engine ENG is supplied to the third rotational element N3 of the planetary gear set PG through the first input shaft IS1, the first rotational element N1 is freely rotatable. Thus, the second rotational element N2 does not output any driving torque and therefore a neutral position is enabled.

[Neutral Position Battery Charging]

A neutral position battery charging mode is enabled while the engine ENG is started and running. While the forward first speed shifting gear D1 is synchronized to the first output shaft OS1 by operating the first sleeve SLE1 of the first synchronizer SL1, the engine clutch ECL and the second clutch CL2 is operated.

Then, the torque of the engine ENG is input to the third rotational element N3 of the planetary gear set PG through the first input shaft IS1, and the second rotational element N2 acts as a fixed element by being connected to the first output shaft OS1 due to the operation of the first synchronizer SL1.

In this case, the first rotational element N1 reversely rotates at a high speed, and drives the motor/generator MG through second clutch CL2 to generate electricity and thereby enable electric charging.

[Fixed Gear Ratio Mode 1]

In a fixed gear ratio mode, the engine ENG supplies a primary drive-torque and the motor/generator MG supplies an auxiliary drive-torque.

In a fixed gear ratio mode 1, the forward first speed shifting gear D1 is synchronized to the first output shaft OS1 by operating the first sleeve SLE1 of the first synchronizer SL1, and the engine clutch ECL and the first and second clutches CL1 and CL2 are operated.

By such a control, the torque of the engine ENG and a part of the torque of the motor/generator MG are input to the third rotational element N3 of the planetary gear set PG, and a part of the torque of the motor/generator MG is input to the first rotational element N1 of the planetary gear set PG through the second input shaft IS2.

Consequently, torques are simultaneously input to the first and third rotational elements N1 and N3 of the planetary gear set PG, and the planetary gear set PG integrally rotates, thereby outputting a same input torque to the third input shaft IS3 through the second rotational element N2.

Then, the torque is shifted while being transmitted to the first output shaft OS1 through the forward first speed shifting gear D1 externally engaged with the first input gear G1 on the third input shaft IS3, and the shifted torque is transmitted to the differential DIFF through the first output gear OG1 on the first output shaft OS1.

[Fixed Gear Ratio Mode 2]

For the fixed gear ratio mode 2 from the fixed gear ratio mode 1, the synchronous connection of the forward first speed shifting gear D1 to the first output shaft OS1 is released by releasing the first sleeve SLE1 of the first synchronizer SL1, the forward second speed shifting gear D2 is synchronously connected to first output shaft OS1 by operating the second sleeve SLE2 of the second synchronizer SL2, the second clutch CL2 is released, and the third clutch CL3 is operated.

By such a control, the torque of the engine ENG and a part of the torque of the motor/generator MG is input to the third rotational element N3 of the planetary gear set PG and at the same time, to the fourth input shaft IS4.

Then, a shifted torque is transmitted to the first output shaft OS1 through the forward second speed shifting gear D2 externally engaged with the third input gear G3 on the fourth input shaft IS4, and transmitted to the differential DIFF through the first output gear OG1 on the first output shaft OS1.

In this case, the planetary gear set PG does not affect to a shifting of the power transmission apparatus since the first and second rotational elements N1 and N2 may freely rotate.

[Fixed Gear Ratio Mode 3]

For the fixed gear ratio mode 3 from the fixed gear ratio mode 2, the synchronous connection of the forward second speed shifting gear D2 to the first output shaft OS1 is released by releasing the second sleeve SLE2 of the second synchronizer SL2, the forward third speed shifting gear D3 is synchronized to the first output shaft OS1 by operating the first sleeve SLE1 of the first synchronizer SL1, the third clutch CL3 is released, and the second clutch CL2 is operated.

By such a control, the torque of the engine ENG and a part of the torque of the motor/generator MG is input to the third rotational element N3 of the planetary gear set PG, and a part of the torque of the motor/generator MG is input to the first rotational element N1 of the planetary gear set PG through the second input shaft IS2.

Consequently, the torque of the motor/generator MG is simultaneously input to the first and third rotational elements N1 and N3 of the planetary gear set PG, and the planetary gear set PG integrally rotates, thereby outputting a same torque of the motor/generator MG to the third input shaft IS3 through the second rotational element N2.

Then, a shifted torque is transmitted to the first output shaft OS1 through the forward third speed shifting gear D3 externally engaged with the second input gear G2 on the third input shaft IS3, and transmitted to the differential DIFF through the first output gear OG1 on the first output shaft OS1.

[Fixed Gear Ratio Mode 4]

For the fixed gear ratio mode 4 from the fixed gear ratio mode 3, the synchronous connection of the forward third speed shifting gear D3 to the first output shaft OS1 is released by releasing the first sleeve SLE1 of the first synchronizer SL1, the forward fourth speed shifting gear D4 is synchronously connected to the first output shaft OS1 by operating the second sleeve SLE2 of the second synchronizer SL2, the second clutch CL2 is released, and the third clutch CL3 is operated.

By such a control, the torque of the engine ENG and a part of the torque of the motor/generator MG is input to the third rotational element N3 of the planetary gear set PG, and also to the fourth input shaft IS4.

Then, a shifted torque is transmitted to the first output shaft OS1 through the forward fourth speed shifting gear D4 externally engaged with the fourth input gear G4 on the fourth input shaft IS4, and transmitted to the differential DIFF through the first output gear OG1 on the first output shaft OS1.

In this case, the planetary gear set PG does not affect to a shifting of the power transmission apparatus since the first and second rotational elements N1 and N2 may freely rotate.

[Variable Gear Ratio Mode 1]

In a variable gear ratio mode, the torque of the motor/generator MG is used as a driving power source as well as the torque of the engine ENG.

It is notable that the motor/generator MG may rotate at a different speed from the engine ENG, and in this case, the different speeds of the motor/generator MG and the engine ENG may be input to the planetary gear set PG such that the planetary gear may output a variable gear ratio thereby achieving an electronic continuously variable transmission (eCVT) control.

That is, in a variable gear ratio mode 1, the forward first speed shifting gear D1 is synchronized to the first output shaft OS1 by operating the first sleeve SLE1 of the first synchronizer SL1, and the engine clutch ECL and the second clutch CL2 are operated.

In this case, by the operation of the engine clutch ECL, the torque of the engine ENG is input to the third rotational element N3 through the first input shaft IS1 of the planetary gear set PG, and by the operation of the second clutch CL2, the torque of the motor/generator MG is input to the first rotational element N1 through the second input shaft IS2.

Consequently, torques input to the first rotational element N1 and the third rotational element N3 react at the planetary gear set PG, and a shifted torque is output to the third input shaft IS3 through the second rotational element N2.

Then the shifted torque is transmitted to the first output shaft OS1 through the forward first speed shifting gear D1 externally engaged with the first input gear G1 on the third input shaft IS3, and transmitted to the differential DIFF through the first output gear OG1 on the first output shaft OS1.

[Variable Gear Ratio Mode 2]

For the variable gear ratio mode 2 from the variable gear ratio mode 1, the synchronous connection of the forward first speed shifting gear D1 to the first output shaft OS1 is released by operating the first sleeve SLE1 of the first synchronizer SL1, and the first output shaft OS1 and the forward third speed shifting gear D3 are connected.

A shifting from the variable gear ratio mode 1 to the variable gear ratio mode 2 is not directly performed and achieved by intermediately operating the clutches CL1, CL2, and CL3 in a state of the fixed gear ratio mode 2, so as to reduce or prevent a shift shock.

Here, the first, second, and third clutches CL1, CL2, and CL3 are firstly operated from the state of the variable gear ratio mode 1 to the state of the fixed gear ratio mode 2. Subsequently, the synchronous connection of the first output shaft OS1 and the forward first speed shifting gear D1 is released by releasing the first synchronizer SL1, and the first output shaft OS1 and the forward third speed shifting gear D3 are synchronized by operating the first synchronizer SL1.

When the first output shaft OS1 and the forward third speed shifting gear D3 are synchronized, the operation of the first clutch CL1 and the third clutch CL3 are released, and the second clutch CL2 is operated.

In this case, the torque of the engine ENG is input to the third rotational element N3 of the planetary gear set PG through the first input shaft IS1 by the operation of the engine clutch ECL, and the torque of the motor/generator MG is input to the first rotational element N1 through the second input shaft IS2 by the operation of the second clutch CL2.

Consequently, torques input to the first rotational element N1 and the third rotational element N3 react at the planetary gear set PG, and a shifted torque is output to the third input shaft IS3 through the second rotational element N2.

Then, a shifted torque is transmitted to the first output shaft OS1 through the forward third speed shifting gear D3 externally engaged with the second input gear G2 on the third input shaft IS3, and transmitted to the differential DIFF through the first output gear OG1 on the first output shaft OS1.

[EV Mode 1]

In an electric vehicle mode (EV mode), the engine ENG is stopped, and only the torque of the motor/generator MG is used to drive a vehicle.

In an EV mode 1, the forward first speed shifting gear D1 is synchronized to the first output shaft OS1 by operating the first sleeve SLE1 of the first synchronizer SL1, and the first and second clutches CL1 and CL2 are operated.

By such a control, the torque of the motor/generator MG is simultaneously input to the third rotational element N3 and the first rotational element N1 through the first input shaft IS1 and the second input shaft IS2.

Consequently, the torque of the motor/generator MG is simultaneously input to the first and third rotational elements N1 and N3 of the planetary gear set PG, and the planetary gear set PG integrally rotates, thereby outputting a same torque of the motor/generator MG to the third input shaft IS3 through the second rotational element N2.

Then, a shifted torque is transmitted to the first output shaft OS1 through the forward first speed shifting gear D1 externally engaged with the first input gear G1 on the third input shaft IS3, and transmitted to the differential DIFF through the first output gear OG1 on the first output shaft OS1.

In such an EV mode 1, a gear ratio of the first input gear G1 and the forward first speed shifting gear D1 is activated.

[EV Mode 2]

For the EV mode 2 from the EV mode 1, the second clutch CL2 is released, the synchronous connection of the forward first speed shifting gear D1 to the first output shaft OS1 is released by releasing the first sleeve SLE1 of the first synchronizer SL1, the forward second speed shifting gear D2 is synchronously connected to the first output shaft OS1 by operating the second sleeve SLE2 of the second synchronizer SL2, and the third clutch CL3 is operated.

By such a control, the torque of the motor/generator MG is only input to the first input shaft IS1.

Then, a shifted torque is transmitted to the first output shaft OS1 through the forward second speed shifting gear D2 externally engaged with the third input gear G3 on the fourth input shaft IS4, and transmitted to the differential DIFF through the first output gear OG1 on the first output shaft OS1.

In this case, the planetary gear set PG does not affect to a shifting of the power transmission apparatus since the first and second rotational elements N1 and N2 may freely rotate.

[EV Mode 3]

For the EV mode 3 from the EV mode 2, the third clutch CL3 is released, the synchronous connection of the forward second speed shifting gear D2 to the first output shaft OS1 is released by releasing the second sleeve SLE2 of the second synchronizer SL2, the forward third speed shifting gear D3 is synchronized to the first output shaft OS1 by operating the first sleeve SLE1 of the first synchronizer SL1, and the second clutch CL2 is operated.

By such a control, the torque of the motor/generator MG is simultaneously input to the third rotational element N3 and the first rotational element N1 through the first input shaft IS1 and the second input shaft IS2.

Consequently, the torque of the motor/generator MG is simultaneously input to the first and third rotational elements N1 and N3 of the planetary gear set PG, and the planetary gear set PG integrally rotates, thereby outputting a same torque of the motor/generator MG to the third input shaft IS3 through the second rotational element N2.

Then, a shifted torque is transmitted to the first output shaft OS1 through the forward third speed shifting gear D3 externally engaged with the second input gear G2 on the third input shaft IS3, and transmitted to the differential DIFF through the first output gear OG1 on the first output shaft OS1.

[EV Mode 4]

For the EV mode 4 from the EV mode 3, the second clutch CL2 is released, the synchronously connection of the forward third speed shifting gear D3 to the first output shaft OS1 by releasing the first sleeve SLE1 of the first synchronizer SL1, the first output shaft OS1 is synchronously connected to the forward fourth speed shifting gear D4 by operating the second sleeve SLE2 of the second synchronizer SL2, and the third clutch CL3 is operated.

By such a control, the torque of the motor/generator MG is input to the fourth input shaft IS4 through the first input shaft IS1.

Then, a shifted torque is transmitted to the first output shaft OS1 through the forward fourth speed shifting gear D4 externally engaged with the fourth input gear G4 on the fourth input shaft IS4, and transmitted to the differential DIFF through the first output gear OG1 on the first output shaft OS1.

In this case, the planetary gear set PG does not affect to a shifting of the power transmission apparatus since the first and second rotational elements N1 and N2 may freely rotate.

[EV Mode R (Reverse Speed; Motor is Reversely Driven)]

In an EV mode R, only a reversal torque of the motor/generator MG is used to drive a vehicle while the engine ENG is stopped.

In the EV mode R, while, the engine ENG is stopped, the forward first speed shifting gear D1 is synchronized to the first output shaft OS1 by operating the first sleeve SLE1 of the first synchronizer SL1, and the first and second clutches CL1 and CL2 are operated.

By such a control, a reversal torque of the motor/generator MG is simultaneously input to the third rotational element N3 and the first rotational element N1 through the first input shaft IS1 and the second input shaft IS2.

Consequently, the torque of the motor/generator MG is simultaneously input to the first and third rotational elements N1 and N3 of the planetary gear set PG, and the planetary gear set PG integrally rotates reversely, thereby outputting a same torque of the motor/generator MG to the third input shaft IS3 through the second rotational element N2.

Then, a shifted torque is transmitted to the first output shaft OS1 through the forward first speed shifting gear D1 externally engaged with the first input gear G1 on the third input shaft IS3, and transmitted to the differential DIFF through the first output gear OG1 on the first output shaft OS1.

Shifting operation has been described above with reference to a case of sequential upshifting, and it will be understood that shifting operation of sequential downshifting may be achieved by an opposite control.

In addition, the reverse speed has not been described in connection with the fixed gear ratio mode and the variable gear ratio mode, which is because a separate reverse speed shifting device is not included.

Thus, the reverse speed may be achieved only in the EV mode of a power transmission apparatus of a hybrid electric vehicle according to a first exemplary form of the present disclosure.

Figure 3:
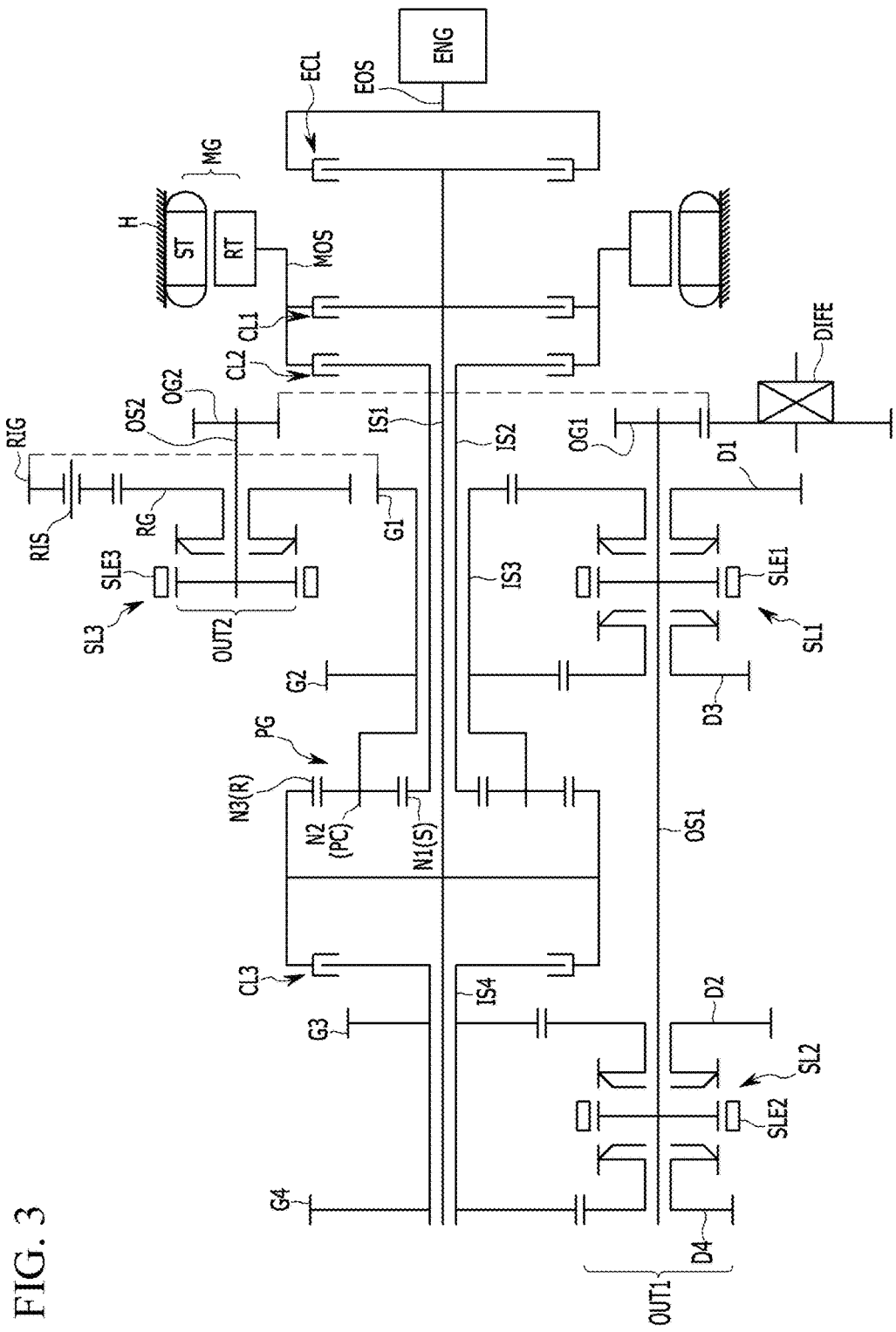
FIG. 3 is a schematic diagram of a power transmission apparatus of a hybrid electric vehicle according to a second exemplary form of the present disclosure.

FIG. 3 is a schematic diagram of a power transmission apparatus of a hybrid electric vehicle according to a second exemplary form of the present disclosure.

Referring to FIG. 3, a power transmission apparatus of a hybrid electric vehicle further includes second shifting output device OUT2 for shifting to a reverse speed, in comparison with a power transmission apparatus of a hybrid electric vehicle according to a first exemplary form of the present disclosure.

The second shifting output device OUT2 includes a second output shaft OS2 disposed in parallel with the first input shaft IS1, a reverse speed shifting gear RG rotatably disposed on the second output shaft OS2, and a third synchronizer SL3 for selectively synchronizing the reverse speed shifting gear RG to the second output shaft OS2.

The second shifting output device OUT2 further includes a reverse speed idle shaft RIS disposed in parallel with the second output shaft OS2 and a reverse speed idle gear RIG disposed on the reverse speed idle shaft RIS and externally engaged the reverse speed shifting gear RG and first input gear G1.

The reverse speed idle gear RIG is rotatably disposed on the reverse speed idle shaft RIS, and transmits a torque received from the first input gear G1 to the reverse speed shifting gear RG in a reverse rotation.

The torque shifted at the second shifting output device OUT2 is transmitted to the differential device DIFF disposed at an upstream portion of the second output shaft OS2, through a second output gear OG2.

The third synchronizer SL3 may be formed as a known scheme, and the third sleeve SLE3 applied to the third synchronizer SL3 may be operated by an actuator (not shown) that may be controlled by a transmission control unit.

FIG. 4 is an operational chart for respective shift-stages of a power transmission apparatus of a hybrid electric vehicle according to a second exemplary form of the present disclosure.

Referring to FIG. 4, a power transmission apparatus of a hybrid electric vehicle further provides reverse speeds in the fixed gear ratio mode and variable gear ratio mode respectively, in comparison with the first exemplary form.

Therefore, reverse speeds in such fixed gear ratio mode and variable gear ratio mode are hereinafter described in detail.

[Fixed Gear Ratio Mode R (Reverse Speed)]

In the fixed gear ratio mode R, the reverse speed shifting gear RG is synchronized to the second output shaft OS2 by operating the third sleeve SLE3 of the third synchronizer SL3, and then the engine clutch ECL and the first and second clutches CL1 and CL2 are operated.

By such a control, the torque of the engine ENG and a part of the torque of the motor/generator MG is input to the third rotational element N3 of the planetary gear set PG, and a part of the torque of the motor/generator MG is input to the first rotational element N1 of the planetary gear set PG through the second input shaft IS2.

Consequently, torques are simultaneously input to the first and third rotational elements N1 and N3 of the planetary gear set PG, and the planetary gear set PG integrally rotates, thereby outputting a same torque of the motor/generator MG to the third input shaft IS3 through the second rotational element N2.

Then, the reverse speed shifting gear RG synchronized to the second output shaft OS2 receives a reverse torque from the first input gear G1 through the reverse speed idle gear RIG, and the reverse torque is output to the differential DIFF through the second output gear OG2 of the second output shaft OS2.

[Variable Gear Ratio Mode R (Reverse Speed)]

In the variable gear ratio mode R, the reverse speed shifting gear RG is synchronized to the second output shaft OS2 by operating the third sleeve SLE3 of the third synchronizer SL3, and then the engine clutch ECL and the second clutch CL2 are operated.

By such a control, the torque of the engine ENG is input to the third rotational element N3 of the planetary gear set PG through the first input shaft IS1 by the operation of the engine clutch ECL, and the torque of the motor/generator MG is input to the first rotational element N1 through the second input shaft IS2 by the operation of the second clutch CL2.

Consequently, torques input through the first rotational element N1 and the third rotational element N3 reacts at the planetary gear set PG, and a shifted torque obtained thereby is output to the third input shaft IS3 through the second rotational element N2.

Then, the reverse speed shifting gear RG synchronized to the second output shaft OS2 receives a reverse torque from the first input gear G1 through the reverse speed idle gear RIG, and the reverse torque is output to the differential DIFF through the second output gear OG2 of the second output shaft OS2.

[EV Mode R (Reverse Speed; Motor-Driven)]

In an EV mode R (motor-driven), only a torque of the motor/generator MG is used to drive a vehicle while the engine ENG is stopped.

In the EV mode R (motor-driven), while the engine ENG is stopped, the reverse speed shifting gear RG is synchronized to the second output shaft OS2 by operating the third sleeve SLE2 of the third synchronizer SL2, and the first and second clutches CL1 and CL2 are operated.

By such a control, the torque of the motor/generator MG is simultaneously input to the third rotational element N3 and the first rotational element N1 through the first input shaft IS1 and the second input shaft IS2.

Consequently, the torques of the motor/generator MG is simultaneously input to the first and third rotational elements N1 and N3 of the planetary gear set PG, and the planetary gear set PG integrally rotates reversely, thereby outputting a same torque of the motor/generator MG to the third input shaft IS3 through the second rotational element N2.

Then, the reverse speed shifting gear RG synchronized to the second output shaft OS2 receives a reverse torque from the first input gear G1 through the reverse speed idle gear RIG, and the reverse torque is output to the differential DIFF through the second output gear OG2 of the second output shaft OS2.

Figure 5:
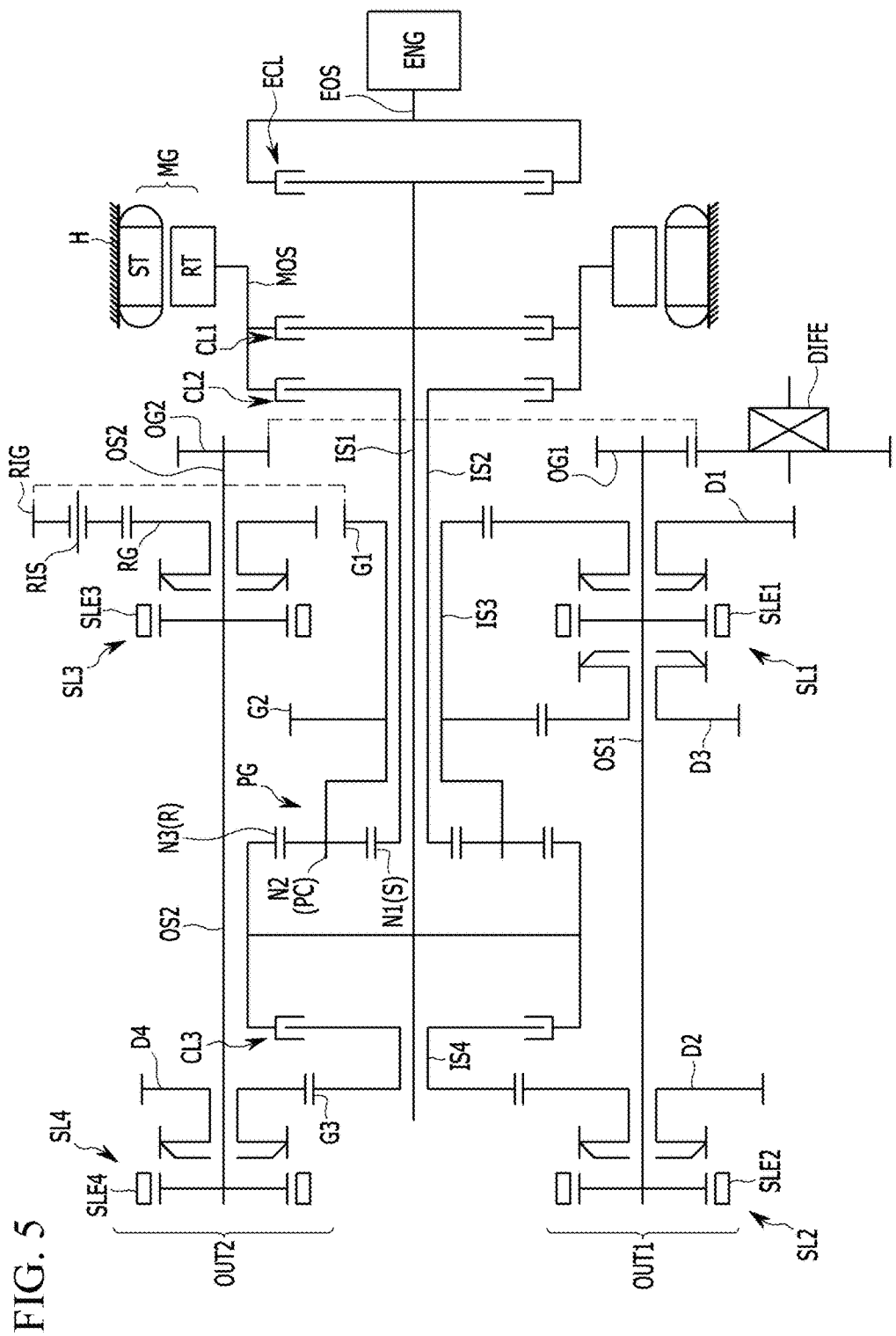
FIG. 5 is a schematic diagram of a power transmission apparatus of a hybrid electric vehicle according to a third exemplary form of the present disclosure.

FIG. 5 is a schematic diagram of a power transmission apparatus of a hybrid electric vehicle according to a third exemplary form of the present disclosure. FIG. 6 is an operational chart for respective shift-stages of a power transmission apparatus of a hybrid electric vehicle according to a third exemplary form of the present disclosure.

Referring to FIG. 5 and FIG. 6, the forward fourth speed shifting gear D4 is fixedly disposed on the second output shaft OS2, while the forward fourth speed shifting gear D4 is disposed on the first output shaft OS1 in the second exemplary form of the present disclosure.

Accordingly, the forward fourth speed shifting gear D4 is synchronously connected with the second output shaft OS2 by operating a fourth sleeve SLE4 of a fourth synchronizer SL4 arranged on the second output shaft OS2.

Therefore, the third exemplary form only differs from the second exemplary form, in addition to the different location of the forward fourth speed shifting gear D4, in that the forward fourth speed shifting gear D4 is synchronously connected to the second output shaft by operating the newly employed fourth synchronizer SL4, not by operating the second synchronizer SL2, in the fixed gear ratio mode 4 and the EV mode 4, and other arrangements and shifting operations are the same.

As described above, power transmission apparatus of a hybrid electric vehicle according to an exemplary form of the present disclosure shows effective improvement of fuel consumption by realizing four shift-stages in a fixed gear ratio mode by using the engine ENG as a primary power source and the motor/generator as an auxiliary power source, two shift-stages in a variable gear ratio mode enabling electronic continuously variable shifting by using the engine ENG and the motor/generator as power sources, and four shift-stages in an EV mode by only using the motor/generator.

In particular, a driving efficiency may be enhanced by operating a power transmission apparatus in the variable gear ratio mode for city driving, and in the fixed gear ratio mode for high speed driving.

In addition, smooth starting of a vehicle may be achieved by the engine ENG and the motor/generator connected with respective rotational elements of the planetary gear set.

When the motor/generator fails, a vehicle may be driven by the torque of the engine ENG.

In the fixed gear ratio mode, the torque of the motor/generator may be used as an auxiliary power source, thereby improving an acceleration performance.

The reverse speed driving may be achieved by reversely driving the motor/generator MG. In addition, a reverse speed shifting device is separately included such that the reverse speed may be realized also in the fixed gear ratio and the variable gear ratio mode as well as the EV mode.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the appended claims.

DESCRIPTION OF SYMBOLS

ENG: engine
CL1, CL2, CL3: first, second, and third clutches
ECL: engine clutch
D1,D2,D3,D4: forward first, second, third, and fourth speed shifting gears
EOS: engine output shaft
G1, G2, G3, G4: first, second, third, and fourth input gears
MG: motor/generator
MOS: motor output shaft
IS1, IS2, IS3, IS4: first, second, third, and fourth input shafts
OS1,OS2: first and second output shafts
OUT1, OUT2: first and second shifting output device
PG: planetary gear set
SL1,SL2,SL3,SL4: first, second, third, and fourth synchronizer

What is claimed is:

1. A power transmission apparatus for a hybrid vehicle including power sources of an engine and a motor/generator, the power transmission apparatus comprising:
    an input unit including a first input shaft selectively connected with an the engine and the motor/generator, a second input shaft selectively connected with the motor/generator, a third input shaft fixedly disposed with at least one input gear, and a fourth input shaft selectively connected with the first input shaft and fixedly disposed with at least one input gear;
    a torque converting unit including a planetary gear set having a first rotational element connected with the second input shaft, a second rotational element connected with the third input shaft, and a third rotational element connected with the first input shaft; and
    a shifting output unit configured to shift torques received from the third and fourth input shafts and configured to output a shifted torque.

2. The power transmission apparatus of claim 1, wherein:
    the second and third input shafts of the input unit are formed as a hollow shaft;
    the first, second, and third input shafts are coaxially disposed in an order of the first, second, and third input shafts in a radial direction; and
    the fourth input shaft is formed as a hollow shaft, disposed rearward to the second and third input shafts and coaxially disposed with the first input shaft.

3. The power transmission apparatus of claim 1, wherein the torque converting unit is disposed on the first input shaft at a location between the second and third input shafts and the fourth input shaft.

4. The power transmission apparatus of claim 1, wherein the torque converting unit is a single pinion planetary gear set having a sun gear as the first rotational element, a planet carrier as the second rotational element, and a ring gear as the third rotational element.

5. The power transmission apparatus of claim 1, wherein the shifting output unit comprises a first shifting output device comprising:
    a first output shaft disposed in parallel with the first input shaft;
    two shifting gears rotatably disposed on the first output shaft, externally engaged with two input gear fixedly formed on the third input shaft, and selectively synchronized with the first output shaft; and
    two shifting gears rotatably disposed on the first output shaft, externally engaged with two input gears fixedly formed on the fourth input shaft, and selectively synchronized with the first output shaft; and
    a first output gear fixedly disposed at an upstream portion of the first output shaft.

6. The power transmission apparatus of claim 5, wherein the shifting output unit comprises a second shifting output device comprising:
    a second output shaft disposed in parallel with the first input shaft;
    a reverse speed shifting gear rotatably disposed on the second output shaft, and selectively synchronized with the second output shaft;
    a reverse speed idle shaft disposed in parallel with the second output shaft;
    a reverse speed idle gear rotatably disposed on the reverse speed idle shaft and externally engaged with at least one input gear of the two input gears on the third input shaft or the reverse shifting gear; and
    a second output gear fixedly disposed at an upstream portion of the second output shaft.

7. The power transmission apparatus of claim 1, wherein the shifting output unit comprises:
    a first shifting output device comprising:
        a first output shaft disposed in parallel with the first input shaft,
        two shifting gears rotatably disposed on the first output shaft, externally engaged with two input gears fixedly formed on the third input shaft, and selectively synchronized with the first output shaft,
        one shifting gear rotatably disposed on the first output shaft, externally engaged with one input gear fixedly formed on the fourth input shaft, and selectively synchronized with the first output shaft, and
        a first output gear fixedly disposed at an upstream portion of the first output shaft; and
    a second shifting output device comprising:
        a second output shaft disposed in parallel with the first input shaft,
        a reverse speed shifting gear rotatably disposed on the second output shaft and selectively synchronized with the second output shaft by a second synchronizer,
        a reverse speed idle shaft disposed in parallel with the second output shaft,
        a reverse speed idle gear rotatably disposed on the reverse speed idle shaft and externally engaged with the reverse speed shifting gear and the at least one input gear on the third input shaft,
        one shifting gear rotatably disposed on the second output shaft, externally engaged with the at least one input gear fixedly formed on the fourth input shaft, and selectively synchronized with the second output shaft, and
        a second output gear fixedly disposed at an upstream portion of the second output shaft.

8. The power transmission apparatus of claim 1,
    wherein the at least one input gear fixedly disposed on the third input shaft comprises a first input gear acting as an input gear for a forward first speed and a second input gear acting as an input gear for a forward third speed,
    wherein input gears fixedly disposed on the first input shaft comprises a third input gear acting as an input gear for a forward second speed and a fourth input gear acting as an input gear for a forward fourth speed, and wherein the first, second, third, and fourth input gears are arranged in the order of the first, second, third, and fourth input gears from upstream to downstream direction.

9. The power transmission apparatus of claim 8, wherein the shifting output unit comprises a first shifting output device comprising:
a first output shaft disposed in parallel with the first input shaft;
forward first and third speed shifting gears externally engaged with the first and second input gears, and selectively synchronized with the first output shaft by a first synchronizer;
forward second and fourth speed shifting gears externally engaged with the third and fourth input gears, and selectively synchronized with the first output shaft by a second synchronizer; and
a first output gear fixedly disposed at an upstream portion of the first output shaft.

10. The power transmission apparatus of claim 9, wherein the shifting output unit further comprises a second shifting output device comprising:
a second output shaft disposed in parallel with the first input shaft;
a reverse speed shifting gear rotatably disposed on the second output shaft and selectively synchronized with the second output shaft by the second synchronizer;
a reverse speed idle shaft disposed in parallel with the second output shaft;
a reverse speed idle gear rotatably disposed on the reverse speed idle shaft and externally engaged with the first input gear and the reverse speed shifting gear; and
a second output gear fixedly disposed at an upstream portion of the second output shaft.

11. The power transmission apparatus of claim 8, wherein the shifting output unit comprises:
a first shifting output device comprising:
a first output shaft disposed in parallel with the first input shaft,
forward first and third speed shifting gears rotatably disposed on the first output shaft, externally engaged with the first and second input gears, and selectively synchronized with the first output shaft by a first synchronizer,
a forward second speed shifting gear rotatably disposed on the first output shaft, externally engaged with the third input gear, and selectively synchronized with the first output shaft by a second synchronizer, and
a first output gear fixedly disposed at an upstream portion of the first output shaft; and
a second shifting output device comprising,
a second output shaft disposed in parallel with the first input shaft,
a reverse speed shifting gear rotatably disposed on the second output shaft and selectively synchronized with the second output shaft by a third synchronizer,
a reverse speed idle shaft disposed in parallel with the second output shaft,
a reverse speed idle gear rotatably disposed on the reverse speed idle shaft and externally engaged with the first input gear and the reverse speed shifting gear,
a forward second speed shifting gear rotatably disposed on the second output shaft, externally engaged with the third input gear on the fourth input shaft, and selectively synchronized with the second output shaft by a fourth synchronizer, and
a second output gear fixedly disposed at an upstream portion of the second output shaft.

12. A power transmission apparatus for a hybrid vehicle including power sources of an engine and a motor/generator, the power transmission apparatus comprising:
an input unit comprising:
a first input shaft selectively connected with the engine and the motor/generator,
a second input shaft formed as a hollow shaft, coaxially and rotatably disposed on the first input shaft, and selectively connected with the motor/generator,
a third input shaft formed as a hollow shaft, coaxially and rotatably disposed on the second input shaft, and fixedly disposed with first and second input gears, and
a fourth input shaft formed as a hollow shaft, disposed rearward to the second and third input shafts, coaxially and rotatably disposed on the first input shaft, selectively connected with the first input shaft, and fixedly disposed with third and fourth input gears;
torque converting unit of a single pinion planetary gear set having a sun gear connected with the second input shaft, a ring gear connected with first input shaft, and a planet carrier connected with the third input shaft; and
a shifting output unit configured to shift torques received from the third and fourth input shafts and to output a shifted torque.

13. The power transmission apparatus of claim 12, wherein the torque converting unit is disposed on the first input shaft at a location between the second input shaft and the fourth input shaft.

14. The power transmission apparatus of claim 12, wherein:
the first input gear acts as an input gear for a forward first speed;
the second input gear acts as an input gear for a forward third speed;
the third input gear acts as an input gear for a forward second speed; and
the fourth input gear acts as an input gear for a forward fourth speed.

15. The power transmission apparatus of claim 12, wherein the shifting output unit comprises a first shifting output device comprising:
a first output shaft disposed in parallel with the first input shaft;
forward first and third speed shifting gears rotatably disposed on the first output shaft, externally engaged with the first and second input gears, and selectively synchronized with the first output shaft by a first synchronizer;
forward second and fourth speed shifting gears rotatably disposed on the first output shaft, externally engaged with the third and fourth input gears, and selectively synchronized with the first output shaft by a second synchronizer; and
a first output gear fixedly disposed at an upstream portion of the first output shaft.

16. The power transmission apparatus of claim 15, wherein the shifting output unit further comprises second shifting output device comprising:
a second output shaft disposed in parallel with the first input shaft;
a reverse speed shifting gear rotatably disposed on the second output shaft and selectively synchronized with the second output shaft by the second synchronizer;

a reverse speed idle shaft disposed in parallel with the second output shaft;
a reverse speed idle gear rotatably disposed on the reverse speed idle shaft and externally engaged with the first input gear and the reverse speed shifting gear; and
a second output gear fixedly disposed at an upstream portion of the second output shaft.

17. A power transmission apparatus of a hybrid electric vehicle including power sources of an engine and a motor/generator, the power transmission apparatus comprising:
an input unit including:
a first input shaft selectively connected with the engine and the motor/generator,
a second input shaft formed as a hollow shaft, coaxially and rotatably disposed on the first input shaft, and selectively connected with the motor/generator,
a third input shaft formed as a hollow shaft, coaxially and rotatably disposed on the second input shaft, and fixedly disposed with first and second input gears,
a fourth input shaft formed as a hollow shaft, disposed rearward to the second and third input shafts, coaxially and rotatably disposed on the first input shaft, selectively connected with the first input shaft, and fixedly disposed with a third input gear;
torque converting unit of a single pinion planetary gear set having a sun gear connected with the second input shaft, a ring gear connected with first input shaft, and a planet carrier connected with the third input shaft; and
a shifting output unit configured to shift torques received from the third and fourth input shafts and to output a shifted torque,
wherein the shifting output unit comprises first and second shifting output devices,
wherein the first shifting output device comprises:
a first output shaft disposed in parallel with the first input shaft,
forward first and third speed shifting gears rotatably disposed on the first output shaft, externally engaged with the first and second input gears, and selectively synchronized with the first output shaft by a first synchronizer,
a forward second speed shifting gear rotatably disposed on the first output shaft, externally engaged with the third input gear, and selectively synchronized with the first output shaft by a second synchronizer, and
a first output gear fixedly disposed at an upstream portion of the first output shaft,
wherein a second shifting output device comprises:
a second output shaft disposed in parallel with the first input shaft,
a reverse speed shifting gear rotatably disposed on the second output shaft and selectively synchronized with the second output shaft by a third synchronizer,
a reverse speed idle shaft disposed in parallel with the second output shaft,
a reverse speed idle gear rotatably disposed on the reverse speed idle shaft and externally engaged with the first input gear and the reverse speed shifting gear,
a forward second speed shifting gear rotatably disposed on the second output shaft, externally engaged with the third input gear, and selectively synchronized with the second output shaft by a fourth synchronizer, and
a second output gear fixedly disposed at an upstream portion of the second output shaft.

* * * * *